United States Patent Office 2,809,187
Patented Oct. 8, 1957

2,809,187

STYRENE COPOLYMERS

Earl C. Chapin and Raymond I. Longley, Jr., Springfield, Mass., assignors to Monsanto Chemical Company, St. Louis, Mo., a corporation of Delaware No Drawing. Application November 1, 1954,
Serial No. 466,226

6 Claims. (Cl. 260—88.1)

This invention relates to copolymers of aromatic compounds having a side chain containing ethylenic unsaturation. More particularly, the invention relates to copolymers of styrene and styrene derivatives with coumarin.

Styrene, alpha alkyl styrenes and ring-substituted styrenes may be homopolymerized and copolymerized to obtain thermoplastic molding materials having excellent electrical properties. The major drawback for many applications of these molding powders is their relatively low heat distortion temperature, i. e., they cannot be used where they may be subjected to temperatures of above 90° C. for any substantial periods of time. Efforts have been made to improve this property by copolymerizing the styrene or styrene derivative with a small amount of various polymerizable compounds. However, the comonomers most effective in raising the heat distortion point have been polar compounds which severely reduce the electrical insulating properties of the molding material.

One object of this invention is to provide new copolymers of aromatic compounds having a side chain containing ethylenic unsaturation.

Another object is to provide copolymers of styrene or styrene derivatives which have relatively high heat distortion temperatures coupled with good electrical insulating properties.

A further object is to provide coplymers of styrene or styrene derivatives with coumarin.

These and other objects are attained by copolymerizing styrene or a ring-substituted styrene with from 1 to 25% by weight of coumarin or a benzene ring-substituted coumarin.

The following examples are given in illustration and are not intended as limitations on the scope of this invention. Where parts are mentioned, they are parts by weight.

Example 1

Dissolve 12 parts of coumarin and 0.1 part of di(tertiary butyl) peroxide in 100 parts of styrene monomer. Heat the solution with agitation at about 90° C. for about 24 hours and then raise the temperature gradually to about 180° C. and finish the reaction at 180° C. over a period of about 30 hours. The product is a hard, clear and substantially colorless copolymer of styrene and coumarin containing about 7 parts of combined coumarin. The product may be comminuted and used as a molding powder per se or mixed with conventional additives such as fillers, pigments, dyes, lubricants, etc. However, this material does not have an improved heat distortion temperature due to the 5 parts of unreacted coumarin still in the copolymer.

To remove unreacted coumarin, dissolve the copolymer in a suitable solvent such as toluene and then precipitate the copolymer in a non-solvent such as methanol. This procedure effectively removes the unreacted coumarin. The copolymer, after all of the solvent and non-solvent are removed by drying, is a clear and hard material having a heat distortion temperature of about 105–110° C. and electrical properties substantially identical with those of styrene homopolymers.

Example II

Disperse 5 parts of coumarin in an aqueous medium containing 3.5 parts of the sodium salt of sulfonated mineral oil and 0.4 part of triethanolamine. Heat the dispersion to reflux temperature at atmospheric pressure and add 95 parts of styrene slowly over a period of about 50 minutes. Simultaneously with the addition of the styrene, add 0.15 part of potassium persulfate dissolved in 25 parts of water. The catalyst addition should also be made slowly and the addition should take as long as the addition of styrene and preferably a little longer. Throughout the addition of styrene and catalyst, keep the aqueous medium at reflux temperature at atmospheric pressure accompanied by continuous agitation. When the reaction is complete, subject the reaction medium to steam distillation to remove any unreacted monomer. The product is an aqueous emulsion of a copolymer of styrene and coumarin. The copolymer may be recovered by coagulating the emulsion by conventional means such as by freezing followed by filtration and washing of the filtered precipitate.

The copolymer of Example II contains about 4% coumarin by weight. It may be molded by conventional means such as injection and compression molding and may be extruded in conventional extruders. Materials molded therefrom have a heat distortion temperature of about 105–110° C.

Repeat Example II using 20 parts of coumarin and 80 parts of styrene. No difficulty is encountered in obtaining moldable copolymers containing 15–16% coumarin by weight. This copolymer produces articles having a heat distortion temperature in the range of 118–120° C.

The copolymers of this invention are copolymers of styrene, ring substituted styrenes or mixtures thereof with coumarin, ring substituted coumarin or mixtures thereof. The substituted styrenes may be mono- or polyalkyl styrenes such as methyl, ethyl, isopropyl, etc. styrenes or chlorostyrenes such as mono-, di-, and tri-chlorostyrenes. Coumarin consists of a benzene ring with a lactone ring side-chain. The substituents in the coumarin should be on the benzene ring and may be alkyl such as methyl, ethyl, butyl, etc. or may be chlorine.

Based on the styrene component as 100 parts, from 1 to 25 parts of coumarin component may be used. As a rule, only a part of the coumarin component will copolymerize leaving a substantial amount of coumarin monomer which should be removed from the copolymer if high heat distortion temperatures are to be obtained. As a result, an excess of coumarin monomer should be used for any particular amount of coumarin to be combined in the copolymer.

The copolymers may be obtained by mass, suspension or emulsion polymerization generally in the presence of a free radical initiator. If mass polymerization is used, the unreacted monomer is best removed by dissolving the copolymer in a solvent for both the copolymer and monomer and then precipitating the copolymer with a material which is a solvent for the monomer but not for the copolymer. In the emulsion or suspension systems, substantially all of the unpolymerized monomers can be removed by steam distillation.

In the mass copolymerization process, the polymerization is first conducted at from 90 to 100° C. until from 25 to 35% of the polymerization has occurred and then the temperature is raised gradually to from 185 to 200° C. and maintained at the elevated temperature until the reaction is complete. Whereas a free radical catalyst is advantageous, the mass process can be carried out in the absence of catalyst by careful temperature control.

In the suspension or emulsion process, it is convenient to use a redox catalyst system such as the one shown in Example II and to carry out the reaction at reflux temperature at atmopheric pressure. The coumarin component may be dispersed in the aqueous phase and the styrene component may be added thereto slowly over a period of 50 to 90 minutes accompanied by the slow addition of the peroxy part of the redox catalyst.

The copolymers of this invention are particularly advantageous in that they have heat distortion temperatures well above 100° C. and at the same time they have substantially the same extremely favorable electrical insulating properties as styrene homopolymers. In spite of their high heat distortion temperatures, the copolymers of this invention may be processed easily by conventional techniques including compression, injection molding and extrusion.

Conventional additives may be incorporated in the copolymers prior to processing by dry blending, roll milling, etc. Among such additives are pigments, dyes, fillers, lubricants, etc.

What is claimed is:

1. A copolymer of 100 parts of a styrene monomer and from 1 to 25 parts of a coumarin monomer, said styrene monomer being taken from the group consisting of styrene, ring-substituted alkyl styrenes, ring-substituted chlorostyrenes and mixtures thereof, said coumarin monomer being taken from the group consisting of coumarin, benzene ring-substituted alkyl coumarins, benzene ring-substituted chlorocoumarins and mixtures thereof.

2. A copolymer of styrene and coumarin containing about 4% combined coumarin by weight.

3. A copolymer of styrene and coumarin containing 15–16% combined coumarin by weight.

4. The process for preparing copolymers of 100 parts of a styrene monomer and from 1 to 25 parts of coumarin monomer which consists of polymerizing the styrene monomer with an excess of the coumarin monomer in the presence of a free radical initiator, the styrene monomer being taken from the group consisting of styrene, ring-substituted alkyl styrenes, ring-substituted chlorostyrenes, and mixtures thereof, the coumarin monomer being taken from the group consisting of coumarin, benzene ring-substituted alkyl coumarins, benzene ring-substituted chlorocoumarins and mixtures thereof.

5. The process for preparing copolymers of 100 parts of styrene and from 1 to 25 parts of coumarin which comprises polymerizing styrene with an excess of coumarin in mass in the presence of a free radical initiator.

6. The process for preparing copolymers of 100 parts of styrene and from 1 to 25 parts of coumarin which comprises polymerizing styrene with an excess of coumarin in an aqueous medium in the presence of a free radical initiator.

References Cited in the file of this patent

UNITED STATES PATENTS

| | | |
|---|---|---|
| 2,529,316 | Smyers | Nov. 7, 1950 |
| 2,697,092 | Coover | Dec. 14, 1954 |

OTHER REFERENCES

Lewis: J. Polymer Sci. vol. 6, page 777 (1951).